Figure 1:
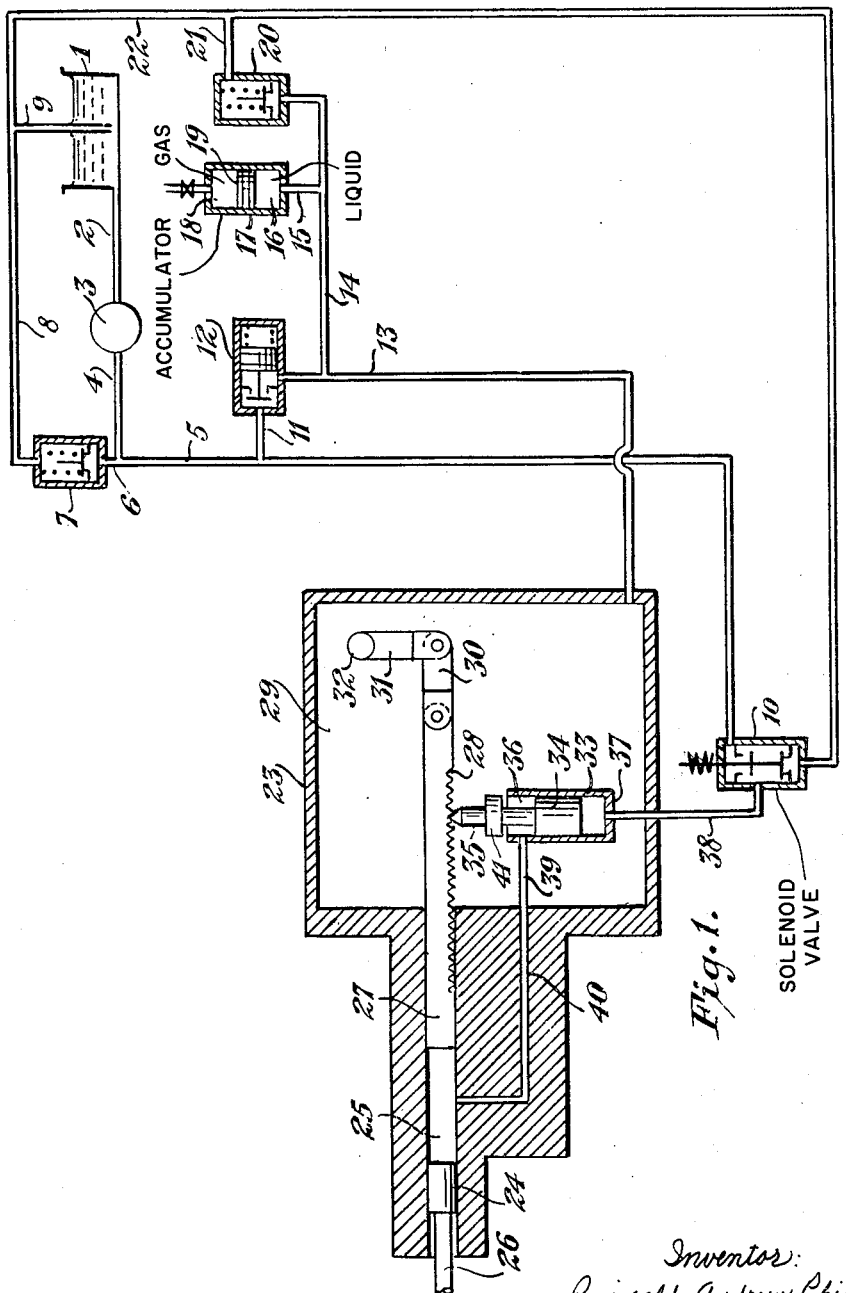

Dec. 18, 1962  R. A. PHILLIPS  3,068,650
HYDRAULIC INDEXING DEVICE
Filed April 13, 1960  2 Sheets-Sheet 1

Inventor:
Reginald Andrew Phillips
BY Baldwin & Wight
Attorneys

Dec. 18, 1962 R. A. PHILLIPS 3,068,650
HYDRAULIC INDEXING DEVICE
Filed April 13, 1960 2 Sheets-Sheet 2

Inventor:
Reginald Andrew Phillips
BY Baldwin & Wight
Attorneys

United States Patent Office 3,068,650
Patented Dec. 18, 1962

3,068,650
HYDRAULIC INDEXING DEVICE
Reginald Andrew Phillips, Prestatyn, North Wales, assignor to Electro-Hydraulics Limited, Warrington, England, a British company
Filed Apr. 13, 1960, Ser. No. 22,024
Claims priority, application Great Britain Apr. 16, 1959
7 Claims. (Cl. 60—54.5)

This invention relates to hydraulic apparatus and more particularly to hydraulic indexing devices which may for example but not exclusively be utilised in a warp knitting machine such as an F.N.F. machine.

One object of the invention is to provide high speed hydraulic apparatus in which an output member has to be successively positioned in any one of a number of pre-selected equi-spaced positions, the difference between two adjacent such positions being hereinafter referred to as unit displacement, and in which an input member is moved or allowed to move by such an amount as to cause or allow respectively displacement of the output member of approximately the required number of units.

According to the present invention hydraulic apparatus for positioning an output member in any one of a number of pre-selected equally spaced positions comprises an input member, an output member, means for biassing the output member in one direction, the input member, upon receipt of an appropriate signal, causing displacement of the output member to a selected extent against its bias or allowing its displacement by its bias, mechanism for accurately positioning and locking the output member in any one of the pre-selected positions and supplementary means for enabling the forces acting on the output member to be balanced immediately prior to the locking of the output member.

In one arrangement the output member is directly coupled to a plunger and this is spaced from the input member in a cylinder by hydraulic liquid; in an alternative arrangement the output member acts through an intermediate member and a plunger device in hydraulic communication with the input member.

The input means may comprise a single liquid displacing piston operated by a control mechanism which, in response to an appropriate signal, either moves the piston or allows the piston to be moved a selected extent, so as to cause or allow displacement of a volume of liquid trapped between the piston and the plunger and hence a corresponding displacement of the plunger.

Alternatively the input means may comprise a plurality of liquid displacing pistons each adapted to cause or to allow displacement of a volume of liquid trapped between them and the plunger, so as to cause or to allow a corresponding displacement of the plunger, according to the presence or absence of an electrical signal applied to solenoid means associated with each of the pistons, the arrangement being such that the extent of the displacement of the trapped volume of liquid is defined by the sum of the volumes of liquid displaced by the pistons operated.

As will be apparent from the description of the drawings, the output member is locked between its movements. The actual locking function attains accurate location of the output member and holds it in that position against movement by its bias.

The means for biassing the output member may comprise a further piston operatively coupled or linked to the output member, which piston is supplied with liquid at a constant pressure, the pressure being less than that available at the input means.

The means for accurately positioning and locking the output member in any one of the pre-selected positions may comprise a rack which is adapted to be moved with or by the plunger, and a locking tooth arranged to engage the rack which is provided with teeth corresponding to the desired equally spaced predetermined positions of the output member; the locking tooth is mechanically coupled to and operated by a slide valve, which valve forms a part of the supplementary means whereby liquid is supplied to one end of the plunger, at the same pressure as that exerted by the biassing means at the other end thereof, so as to balance the forces exerted on each end of the plunger, the valve being arranged to block the supply of liquid to the plunger when the locking tooth is out of engagement with the rack. The operation of the slide valve may be controlled by a solenoid valve in the hydraulic circuit.

In an alternative arrangement the rack is formed as a toothed quadrant acted upon either by the plunger or the output member, a toothed pivotal bell crank lever being provided to co-operate with said toothed quadrant and acted upon by the slide valve.

In the latter arrangement the movement of the slide valve may be controlled by a timing mechanism operating a supplementary liquid pressure slide valve mechanism in circuit wtih said slide valve.

Figure 2:
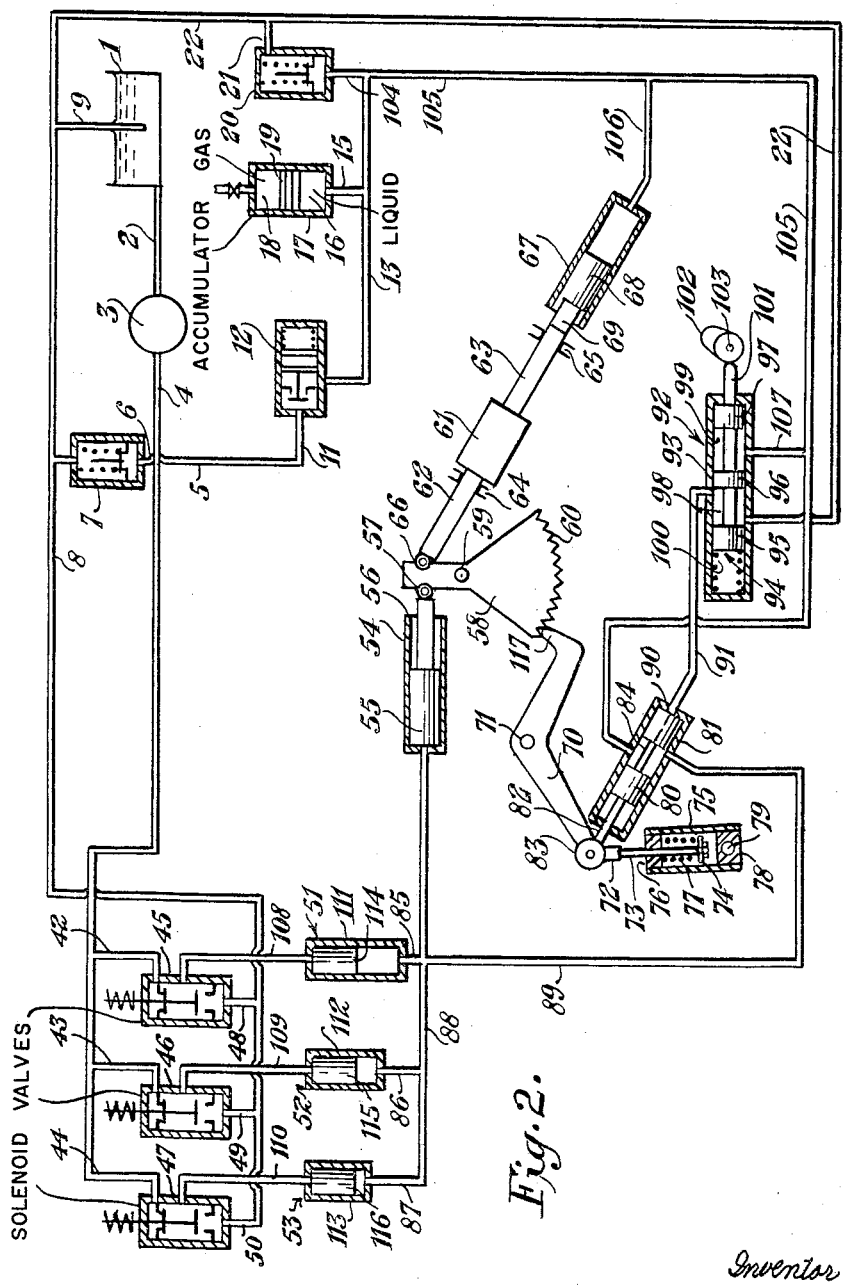

The invention is diagrammatically illustrated in the accompanying drawings in which:

FIGURE 1 shows one form utilising a single fluid displacing device as part of the input means, whilst FIGURE 2 shows the input means including three fluid displacing piston devices.

Referring to FIGURE 1, a liquid reservoir 1 is connected by a conduit 2 to an hydraulic pump 3, which pump delivers into a conduit 4 and thence into conduits 5 and 6. A pressure relief valve 7 is connected to the conduit 6 and relieves via conduits 8 and 9 back to the reservoir 1. Conduit 5 is connected to a three-way solenoid operated valve 10, and by branch conduit 11, to a pressure reducing valve 12. A conduit 13 connected to the reduced pressure side of the valve 12 has a branch conduit 14 to which is connected by a conduit 15, the liquid side 16 of an accumulator 17, which side 16 is separated from a gas side 18 under pressure by a floating piston 19. A pressure relief valve 20 is connected to the conduit 14, which valve relieves into a conduit 21 and thence through conduits 22 and 9 back to the reservoir 1.

In a hydraulic device 23 is a piston 24 reciprocable in a bore 25 formed in the device, the piston rod 26 being controlled by a suitable adding/subtracting mechanism (not shown) which, with the piston, comprises the input means. A plunger 27 also reciprocable in the bore 25 is provided with a toothed rack 28, which protrudes into a main chamber 29 and is connected by a link 30 pivoted to an arm 31 secured to a shaft 32, which arm and shaft comprise an output member. Reciprocable in a valve body 33 is a slide valve 34, which is provided with a locking tooth 35 to mate with the recess between successive teeth of the rack 28, and is cut way to leave an annulus 36. The valve body 33 is open at the top and at the lower end 37 connected by a conduit 38 to the solenoid operated valve 10, and by a conduit 39 the valve body is connected to a drilling 40 in the device 23, which drilling runs into the bore 25 between the piston 24 and the plunger 27. The end of the conduit 13 remote from the pressure-reducing valve 12, is connected to the chamber 29. The conduit 22 connects the solenoid operated valve 10 with the reservoir 1 via the conduit 9.

The piston 24 and the rod 26 of the input means are coupled to the adding/subtracting mechanism (not shown) which is arranged to impart to the piston 24 a number of units of displacement. The adding/subtracting mechanism may for example have three components giving respectively unit displacement, two units of displacement and four units of displacement. According to signals given to the adding/subtracting mechanism the piston 24 and rod 26 may be moved a single unit (component one), two units (component two), three units (components one and two), four units (component three), and so on to a maximum of seven units of displacement (1+2+4). The spacing of the recesses in the rack 28 correspond to unit displacement of the input member.

The apparatus as shown in FIGURE 1 and indeed that shown in FIGURE 2, which will be described below, is particularly suitable for controlling the movement of the guide bar or bars of a warp knitting machine and in such cases the adding/subtracting mechanism is arranged to effect units of displacement in accordance with a preset programme.

As shown in FIGURE 1 the tooth 35 is engaged in one of the recesses of the rack 28, so that the output member is locked in this position. When a signal is received by the input member to re-position the output member, this latter is maintained in its locked position as shown, due to the fact that the pump 3 delivers liquid from the reservoir 1 under pressure through conduits 4 and 5 to the solenoid operated valve 10 (shown energised) and thence through the conduit 38 and end 37 of valve body 33, where it acts on the slide valve 34 and maintains the locking tooth 35 in engagement with a recess in the rack 28. Liquid under pressure is also passed through the conduit 11 to the pressure reducing valve 12, which is set, for example, to reduce the pump delivery pressure by half. From this valve liquid at reduced pressure, hereinafter referred to as half pressure, passes through the conduit 13 into the chamber 29 and also passes through conduits 14 and 15 to the side 16 of the accumulator 17. Surplus liquid at the normal and reduced pressures is passed back to the reservoir 1 via relief valves 7 and 20 respectively.

The locking tooth 35 being in engagement with the rack 28, a land 41 of the slide valve is clear of the open end of valve body 33 thus admitting liquid at half pressure in the chamber 29 to the annulus 36, conduit 39, drilling 40 and bore 25. The forces acting on both ends of plunger 27 are thus balanced.

To initiate a cycle of operation for movement of the output member 32, the solenoid valve 10 is de-energised so that the end 37 of valve body 33 is connected to reservoir 1 through the conduit 38, the solenoid operated valve 10 and conduits 22 and 9. Half pressure in the chamber 29 acting on the slide valve 34 then moves the lock tooth 35 out of engagement with the rack 28, and causes the land 41 to enter the valve body 33 and seal the liquid in the annulus 36, conduit 40 and bore 25.

It is now assumed that the signal received by the piston rod 26 is such as to cause the piston 24 to move inwardly a pre-selected amount in the bore 25 that is to the right as shown in the drawing. Since the rack 28 is no longer locked by the tooth 35 the piston 24 can move in the bore 25 and thus causes corresponding movement of the plunger 27 due to the liquid trapped in the bore 25.

It will also be appreciated that the movement as described above of the piston 24 and plunger 27 is against the bias of the half pressure acting on the right hand end of the plunger 27. When displacement of the piston 24 and plunger 27 is completed according to the signal received, the solenoid operated valve 10 is energised and liquid under full pressure is thus re-admitted through the conduit 38 to the valve body 33, thus forcing the slide valve 34 upwardly to obtain balance of the forces on each end of the plunger 27; the upward movement of the valve 34 moves the tooth 35 into engagement in the selected recess in the rack 28; thus the output member having been moved is accurately positioned and locked in this selected position.

It will be appreciated that upon an appropriate signal being received the input means, that is to say the piston 24, can produce a displacement of the output member in either direction; thus, if instead of the signal causing movement of the piston 24 to the right as shown, and thus moving the plunger 27, it can allow movement of the piston to the left due to half pressure acting on the right hand end of the plunger 27 effecting movement of said plunger and piston to displace the plunger to the left an amount corresponding to that signalled to the input means.

It will thus be apparent that in this latter case the input means, upon receipt of its appropriate signal, allows displacement of the output member by its bias, whereas in the former case the input means causes displacement against the bias.

Referring now to FIGURE 2 there is shown an alternative construction of the hydraulic indexing device which includes electro-hydraulically operated input means. Corresponding parts of the hydraulic circuit are identified with the same numerals as in FIGURE 1. The pump 3 draws liquid from reservoir 1, through conduit 2 and discharges it under pressure through the conduit 4 to branch conduits 42, 43, 44 which are connected to three-way, solenoid operated valves 45, 46, 47 respectively, which are shown de-energised. Conduits 108, 109 and 110 from these solenoid valves lead to liquid displacing piston devices 51, 52 and 53 respectively.

The piston devices 51, 52, 53 comprise pistons 114, 115 and 116, contained in cylinders 111, 112, 113 respectively, which cylinders are connected by conduits 85, 86 and 87 respectively to a conduit 88. The conduit 88 is connected to a cylinder 54, in which is disposed a plunger 55 having a plunger rod 56, the free end of which bears against a roller 57, pivotally mounted on a toothed quadrant 58, which latter is pivoted at 59. An output member 61 has rods 62, 63 supported in bearings 64, 65 the end of rod 62 remote from output member 61, bearing against a roller 66 pivotally mounted on the quadrant 58, and the end of rod 63 remote from output member 61, bearing against a rod 69 connected to a plunger 68, which is reciprocable in a cylinder 67. Preferably the plungers 68 and 55 are of the same diameter.

A bellcrank lever 70 is provided with a tooth 117 for engagement in the recess between successive teeth 60 on quadrant 58. The lever 70 is pivoted at 71 and at its end remote from tooth 117, is pivotally attached a block 72, to which is connected a rod 73. This rod 73 slides in a guide 76 in a cylinder 75 and at its free end is provided with a collar 74 between which and the guide 76 is fitted a spring 77. This spring 77 bears against the collar 74, and pulls the rod 73 connected to the block 72, and lever 70, so as to hold the locking tooth 117 in engagement in a tooth recess of quadrant 58. At the end of the cylinder 75 remote from the guide 76 is a block 78 having a hole 79 whereby the body 75 is pivotally anchored.

A slide valve 80 contained within a cylinder 81 has a rod 82, which bears against a roller 83 mounted on lever 70, on the same arm as block 72. An annulus 84 is formed in the slide valve 80, which is connected by a conduit 89 to the conduit 88 and by a conduit 105 to the conduit 13.

There is provided a timing device 92 comprising a valve body 93 and a slide valve 94 having lands 95, 96, 97 and a rod 101, which latter is urged into contact with a cam 102 mounted on a shaft 103 by a spring 100. The valve body 93 is connected by the conduit 22 and the conduit 9 to the reservoir 1, by a branch conduit 107 to the conduit 105, and by a conduit 91 to the end 90 of the valve body 81. A branch conduit 106 joins the conduit 105 to the cylinder 67.

In operation an electric signal energises one or more of the solenoid operated valves 45, 46, 47 according to the required change of displacement of the output member. These valves in turn then operate the pistons 114, 115, 116, the stroke of each of which may be different, but they will be in whole number relationships. For example, piston 116 may have unit travel between stops, piston 115 may have travel of 2 units between stops and piston 114 may have travel of 4 units between stops.

Assuming one unit of displacement is required, the solenoid valve 47 is energised and the valves 45 and 46 remain de-energised.

Pump pressure is connected through the conduits 4 and 44 the valve 47 and the conduit 110 to the piston 116. This piston, however, cannot move until the locking tooth 117 has been moved out of engagement with the quadrant 58, thus the shaft 103 is rotated so that the cam 102 moves the valve 94 to the left. Liquid at half pressure can then pass from the conduit 105, through the conduit 107 and across the annulus 99 to the conduit 91, into the cylinder 81, where it acts on the slide valve 80 to force it out, and pivot the lever 70 so that the locking tooth 117 is moved out of engagement with the quadrant 58. At the same time, the slide valve 80 blanks the conduit 89 from the conduit 105 so that a quantity of liquid is trapped in the conduits 89, 88, 87, 86, 85. Since the quadrant has now been unlocked, the plunger 55 is free to move. Pump pressure on the piston 116 moves the latter to the end of its stroke, and a corresponding displacement of the plunger 55 is caused which, in turn, rotates the quadrant 58, which, in turn, displaces the output member 61 against half pressure acting on the plunger 68. When the movement of the plunger 55 is complete, the cam 102 on the shaft 103 has rotated so that the spring 100 urges the slide valve 94 to the right and the conduit 91 is connected across annulus 98 to the conduit 22 and thence to the reservoir 1. The spring 77 now takes charge and urges the lever 70 in an anticlockwise direction, at the same time moving the slide valve 80 towards the end 90 of the body 81 and allowing the admission of liquid at half pressure from the conduit 105 into the conduit 89. The action of the spring 77 urges the locking tooth 117 into the selected tooth recess in the quadrant 58, thus accurately positioning the output member 61 and locking it from movement to the left, movement of the output member to the right being prevented by the liquid pressure acting on the plunger 68.

The solenoid valve 47 is then de-energised and the conduit 110 is thus connected to the reservoir 1 through this valve and the conduits 50, 8 and 9. Half pressure from the conduit 105 through the conduits 89, 88 and 87 acts on the piston 116 to return it to its original position thus re-setting it in readiness for a further operation.

As stated above, the operation so far has provided one unit of displacement of the output member to the right as shown in the drawing. When the operation is completed the solenoid valve 47 as stated above is deenergised in order to return it to its initial position. If a further movement of the output member in the same direction is required, for example of two units, then the solenoid valve 46 is energised and the operation is the same as that described with reference to the solenoid valve 47. Alternatively if a further unit displacement is desired, of course in the same direction, the solenoid valve 47 is again energised, but should the next signal be such as to require one unit displacement in the opposite direction, the solenoid valve 47 is maintained energised, so that full pressure is maintained on the upper end of the piston 116 so as to maintain it at the bottom of its cylinder 113. The shaft 103 is then rotated so that the cam 102 moves the valve 94 to the left. This allows half pressure through the conduits 105 and 107 through the valve through conduit 91 to act on valve 80, to unlock the tooth 117 from the quadrant 58, simultaneously cutting off fluid pressure in conduit 89; the solenoid valve 47 is then de-energised, so that the piston 116 is moved upwardly displacing liquid under pressure through the conduit 110 through the valve 47, conduits 50, 8 and 9 to reservoir. The displacement of the piston 116 is caused by the pressure acting of the plunger 68 and rod 63, output member 61, rod 62 acting on the quadrant 58 through the roller 66, the quadrant thereby pivoting on its pivot 59, to cause displacement of the plunger 55. It will thus be seen that in these circumstances the output member is allowed by the input means to move according to the signal received by the input means.

It will be clear that if any further movement other than unitary is desired the solenoid valves 45, 46 and 47 can be energised or de-energised simultaneously to give the required combination of unit movements.

It will be appreciated that in connection with either construction, when the forces on the plunger are balanced, any leakage of hydraulic liquid, which may have occurred during operation of the apparatus, is automatically made good by the pump.

The input means of the embodiment shown in FIGURE 2 may be modified so that the pistons 114, 115, 116 are directly operated by their associated solenoids, instead of by hydraulic liquid admitted by their respective solenoid operated valves.

It will be appreciated that in order to obtain equal movement of the plunger 55 and the output member 61, the angle subtended at the pivot 59 by the pivots of the rollers 57 and 66 must be equal to the angle between the line of action of the plunger 55 and the line of action of the output member 61. It will also be appreciated that to obtain equal units of displacement of the plunger 55 the spacing of the teeth on the quadrant 58 will be unequal.

The two embodiments of the invention described, may be modified in a number of ways, for example, the input means of FIGURE 2 may be associated with the plunger, rack, and output member of FIGURE 1 and vice versa. The timing valve 92 of the embodiment of FIGURE 2, although preferably cam operated, particularly for high speed machinery, may be operated by other known means, for example liquid pressure admitted by a solenoid operated valve.

It will also be appreciated that instead of biassing the plunger by means of hydraulic pressure a mechanical spring can be employed.

What we claim is:

1. An hydraulic servo mechanism comprising a movable output member biased for movement in one direction, an input member for positioning said output member in a plurality of equally spaced positions, said input member comprising an hydraulic cylinder and piston assembly, a control mechanism operatively connected to said assembly comprising a plunger hydraulically connected to said cylinder and operatively connected to said output member so as to urge it in one direction, said control mechanism being operative to control displacement by said piston of said plunger and said output member in either of two directions, one of which directions being the same as that in which said output member is biased and the other direction being opposite to said one direction, locking mechanism movable to an operative position accurately to position and lock said output member in any one of said spaced positions in accordance with operation of said input member, and supplementary hydraulic means controlled by said locking mechanism and operative to balance the force exerted upon said output member by said biasing means immediately prior to the locking of said output member.

2. An hydraulic mechanism as claimed in claim 1 in which said supplementary hydraulic means comprises a source of liquid under pressure connected to said cylinder, and means to control the supply of liquid from said source to said cylinder, such means being connected for operation by said locking mechanism.

3. An hydraulic mechanism as claimed in claim 1 in which said locking mechanism comprises a rack having teeth arranged to correspond to the desired equally spaced positions of said output member, said rack being operatively connected to said plunger, a locking member, and means to move said locking member into engagement with said rack so as accurately to position and lock said output member.

4. An hydraulic mechanism as claimed in claim 2 in which said locking mechanism includes a slide valve, means to operate said slide valve, and hydraulic connection means between said slide valve and said source of liquid under pressure and connected to one end of said plunger.

5. An hydraulic mechanism comprising a movable output member, input means for positioning said output member in a plurality of equally spaced positions, said input means comprising at least one piston operating in a cylinder, an hydraulic connection between said output member and said cylinder, means to bias said output member in one direction, means to supply to and to trap liquid in said cylinder, electrically operable means connected to move said piston in one direction to effect flow of trapped liquid in said cylinder so that movement of said piston causes a corresponding movement of said output member in one direction against said biasing means and to move said piston in the other direction to provide for movement of said output member in the opposite direction by said biasing means, and means connected to lock said output member in any selected position.

6. An hydraulic apparatus comprising a movable output member, input means for positioning said output member in any of a plurality of equally spaced positions, said input means comprising a plurality of pistons each reciprocable in a cylinuder, a source of liquid under pressure, means to connect and disconnect said source to and from said cylinders respectively, a separate cylinder, a plunger in said separate cylinder operatively connected to said output member, an hydraulic connection means between said separate cylinder and said plurality of cylinders, solenoid means connected to operate the respective pistons of said plurality of pistons, means to bias said output member and said plunger in one direction, said means to connect and disconnect said source of liquid to and from said first named cylinders being arranged to disconnect and hence trap liquid in one or more such cylinders upon operation of the corresponding solenoid means so that, upon movement of any of said plurality of pistons in one direction, liquid will be displaced to cause movement of said plunger and hence said output member in a direction against said biasing means while movement of said piston in the opposite direction provides for movement of said output member by said biasing means, said means to connect and disconnect said source of liquid under pressure being operative to connect said source to said separate cylinder after movement of said output member has taken place, the pressure of said source being such as to balance said biasing means, and mechanism accurately to position and lock said output member immediately following the balancing of the forces thereon.

7. An hydraulic apparatus comprising a movable output member, means for positioning said output member in any one of a plurality of pre-selected positions, comprising an hydraulic cylinder, a source of liquid under pressure, means to connect said source to said cylinder, a piston movable in said cylinder to displace liquid therefrom, a plunger hydraulically connected to said cylinder and arranged upon movement of said piston to partake of a corresponding movement, means to control and effect movement of said piston in a direction and to an extent corresponding to the direction and extent of movements required by said output member, a control valve operative to block said source of liquid under pressure from said cylinder so as to trap liquid therein, and operative after movement of said piston and said plunger to connect said source of liquid under pressure to said cylinder, and locking mechanism to lock said output member against movement, said locking mechanism being connected to said control valve to be operated by the latter after it has connected said source of liquid to said cylinder.

References Cited in the file of this patent

UNITED STATES PATENTS

| | | |
|---|---|---|
| 1,966,421 | Towler | July 10, 1934 |
| 2,305,302 | Mazur | Dec. 15, 1942 |
| 2,361,326 | Silver | Oct. 24, 1944 |
| 2,613,703 | Calvert | Oct. 14, 1952 |
| 2,927,432 | Parry | Mar. 8, 1960 |
| 2,974,492 | Gilovich | Mar. 14, 1961 |